(12) United States Patent
Johnston (10) Patent No.: US 6,499,790 B1
(45) Date of Patent: Dec. 31, 2002

(54) COVERING SYSTEM FOR A TRAILER AND METHOD

(76) Inventor: J. Ben Johnston, 21 Pinecrest La., Monroeville, AL (US) 36460

( * ) Notice: Subject to any disclaimer, the term of this patent is extended or adjusted under 35 U.S.C. 154(b) by 0 days.

(21) Appl. No.: 09/662,320

(22) Filed: Sep. 14, 2000

(51) Int. Cl.$^7$ ............................................. B60J 11/00
(52) U.S. Cl. ............... 296/98; 296/100.14; 296/100.11
(58) Field of Search ........................ 296/98, 100.14, 296/100.11

(56) References Cited

U.S. PATENT DOCUMENTS

| | | | | |
|---|---|---|---|---|
| 3,549,197 A | * | 12/1970 | Sibley ........................ | 296/100 |
| 3,549,199 A | * | 12/1970 | Sibley ........................ | 296/100 |
| 3,628,826 A | * | 12/1971 | Sibley ........................ | 296/98 |
| 4,030,780 A | * | 6/1977 | Petretti ....................... | 296/100 |
| 4,050,734 A | * | 9/1977 | Richard ...................... | 296/98 |
| 4,082,347 A | * | 4/1978 | Petretti ....................... | 296/98 |
| 4,341,416 A | * | 7/1982 | Richard ...................... | 296/98 |
| 4,673,208 A | * | 6/1987 | Tsukamoto ................ | 296/98 |
| 5,238,287 A | * | 8/1993 | Haddad, Jr. ................ | 296/98 |
| 5,292,169 A | * | 3/1994 | O'Brian ...................... | 296/98 |
| 5,388,882 A | * | 2/1995 | Russell et al. ............. | 296/98 |
| 5,722,712 A | * | 3/1998 | Pollen ........................ | 296/100 |
| 5,752,735 A | * | 5/1998 | Fleming et al. ............. | 296/98 |
| 5,803,528 A | * | 9/1998 | Haddad, Jr. ................ | 296/100 |
| RE36,135 E | * | 3/1999 | O'Brian ...................... | 296/98 |
| 5,924,758 A | * | 7/1999 | Dimmer et al. ............. | 296/98 |
| 6,070,313 A | * | 6/2000 | O'Brian ................... | 296/100.14 |
| 6,092,856 A | * | 7/2000 | Ladensack ............. | 296/100.11 |
| 6,199,935 B1 | * | 3/2001 | Waltz et al. ................ | 296/98 |
| 6,206,449 B1 | * | 3/2001 | Searfoss ..................... | 296/98 |
| 6,237,985 B1 | * | 5/2001 | O'Brian ...................... | 296/98 |
| 6,257,646 B1 | * | 7/2001 | Searfoss ..................... | 296/98 |

* cited by examiner

*Primary Examiner*—Ken Patel
(74) *Attorney, Agent, or Firm*—Duane Morris LLP; L. Lawton Rogers, III; D. Joseph English (57) ABSTRACT

A system and method for covering or uncovering a trailer comprising supports adapted to be operatively connected to the ends of a trailer to position a roller, with a cover attached thereto, from one side of the trailer to the other side to thereby cover the trailer and any cargo loaded thereon. The system and method may be performed by a single person anywhere along the transportation route, and the apparatus may be located at a terminal and moved from trailer to trailer. The system and method may also be used to selectively position straps over the top of cargo loaded on a trailer for securing cargo onto the trailer.

43 Claims, 10 Drawing Sheets

COVERING SYSTEM FOR A TRAILER AND METHOD

BACKGROUND

The present invention relates to a covering system for a trailer and any cargo loaded thereon, and finds its greatest utility in the side to side covering and uncovering of cargo on a flat bed trailer.

Protecting cargo from the weather is a major concern of the trucking industry. A trucker may depart a warehouse with cargo loaded and a clear weather forecast, only to encounter inclement weather along the route. The handling of a heavy tarp is a burden at any location, and is particularly problematic along side the roadway, after dark or in a blinding snowstorm. High winds are a particular problem because of the sail area presented by the tarp and the limited number of available hands when in transit to handle the tarp from various positions alongside or atop the trailer. Serious injury has been known to result from an attempt by a driver to single handedly manipulate a tarp atop a trailer or on the cargo on a trailer in high winds.

There have been many attempts to address this issue by providing a mechanical apparatus for covering a load. Where the trailer is an open topped box truck, the problem is less severe, and mechanical tarp unrolling systems are well known. For example, the U.S. Pat. No. 5,803,528 and U.S. Pat. No. 5,806,911 to Haddad, Jr., the O'Daniel U.S. Pat. No. 5,829,818, and the Russell et al. U.S. Pat. No. 5,388,882 disclose a pivoting arm disposed alongside both sides of the open top box for mechanically unrolling a tarp from a roller carried between the distal ends of the pivoting arms. Such systems are generally not intended to protect the cargo from the weather, but to prevent the truck's cargo (i.e., gravel, sand, trash, etc.) from spilling onto the highway and damaging other vehicles. Such systems generally depend on the sides of the box for support of the system and for supporting and thus controlling the tarp as it is unrolled, and are unsuited for flat bed trailers.

Mechanical covers for such open top truck boxes have also been proposed for side to side covering of the box. For example, the Tsukamoto U.S. Pat. No. 4,673,208; the Wilkens U.S. Pat. No. 5,765,901; and the Ellingson U.S. Pat. No. 4,691,957 disclose box top covering systems where the tarp is unrolled from a roller carried between the distal ends of arms pivotably mounted at the ends of the boxes. In these systems, the vertical sides of the truck body provide support and thus help control the tarp as it is unrolled across the top of the box, and such systems are unsuited for flat bed trailers.

The problem is particularly acute for flat bed trailers where the cargo is generally loaded by fork lift from the sides of the trailer. For example, the Trickett U.S. Pat. No. 4,842,323 discloses a roller for a tarp which is positioned at the front of a trailer from which a tarp may be pulled rearward to cover a trailer from front to back with any cargo loaded thereon. However, the truck driver must stand atop the trailer and its cargo and manually pull on the tarp over the cargo the length of the trailer. The danger of being blown off of the top of the cargo as the tarp unwraps is significant in windy conditions, and the physical strength required may be beyond that of many drivers.

Accordingly it is an object of the present invention to provide novel systems and methods which obviate many of the deficiencies of known trailer covering systems, and which allows the cargo to be covered in a safe efficient manner anywhere along the route.

It is another object of the present invention to provide novel systems and methods for covering a trailer and any cargo loaded thereon.

It is still another object of the present invention to provide novel cargo covering systems and methods in which the covering and uncovering may be completed by a single truck driver.

It is yet another object of the present invention to provide a novel cargo covering systems and methods for a flat bed trailer in which the covering and uncovering mechanism does not interfere with the loading and unloading of the trailer cargo, from either side or from above.

Still another object of the present invention is to provide a novel cargo covering system and method which may be selectively used with different trailers.

Another problem encountered by truck drivers occurs during the securing of the cargo to the trailer using straps or other tie down means. Straps must be properly positioned over the cargo, attached to the trailer, and then tightened to secure the cargo to the trailer prior to transport. Typically a truck driver will attempt to properly position the straps over the cargo by throwing the straps from one side of the truck to the other. Many times the result is that some straps land on top of the cargo, some straps are twisted, and other straps fall between the cargo requiring the truck driver to climb atop the trailer and cargo and manually pull the straps over the cargo. Unlike the cover, the straps are easy to pull and have a small sail area, but the chance of injury increases whenever a driver must climb and stand atop the trailer and cargo, or retrieve a strap caught on or between the cargo. In addition, many straps have metal ends or buckles and a person positioned on the opposite side of the trailer, may be injured if struck by a strap thrown over the cargo.

Accordingly, it is yet still another object of the present invention is to provide a novel cargo covering system and method in which straps or other tie down means may be selectively positioned over the cargo loaded on a trailer to secure the cargo to the trailer and/or to secure the cargo cover to the trailer or the cargo.

These and many other objects and advantages of the present invention will be readily apparent to one skilled in the art to which the invention pertains from a perusal of the claims, the appended drawings, and the following detailed description of the preferred embodiments.

DESCRIPTION OF THE PREFERRED EMBODIMENTS

Figure 1:
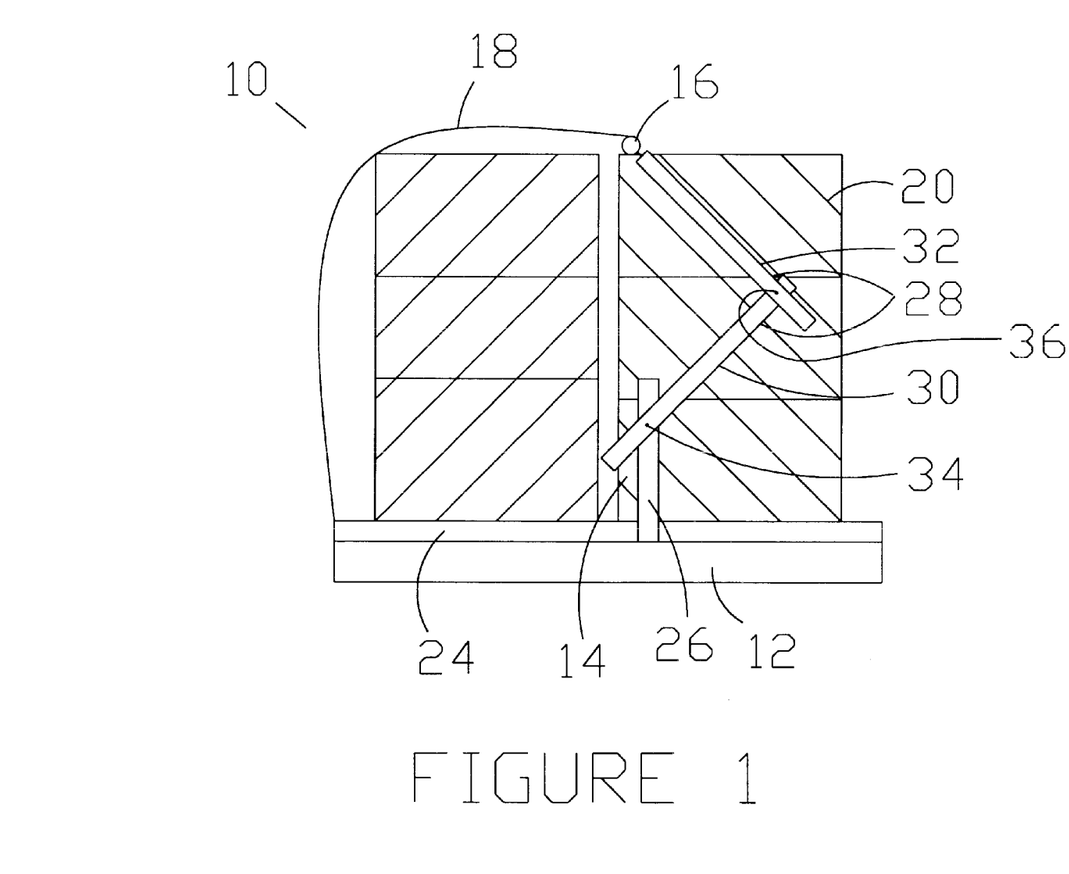
FIG. 1 is a schematic end view of one embodiment of the present invention illustrating the side-to-side placing of a cover over the trailer and its cargo.

FIG. 1 illustrates one embodiment of the present invention. Referring to FIG. 1, the cargo covering system 10 for covering a trailer 12 and any cargo 20 loaded thereon includes a pair of mechanical supports 14, 15 (support 15 is the opposite support, not shown) adapted to be operatively connected at the ends of the trailer 12. The supports may be any suitable material, e.g., steel or aluminum. The supports 14, 15 may be operatively connected to the trailer 12 with any suitable means, e.g., bolting, welding, or by attaching to a removable base. The supports 14, 15 may be attached to the front or rear of the trailer 12. The supports 14, 15 may also be operatively connected to the sides of the trailer 12 immediately adjacent the ends thereof. The supports 14, 15 may include a base 24, upright member 26, and pivotable arm 28. The pivotable arm 28 may be attached to the upright member 26 at a pivot point 34. The pivotable arm 28 may include two pivotable arm members 30, 32 pivotably connected to each other at a pivot point 36. The pivotable arm may also include three pivotable arm members pivotably connected to each other.

The supports 14, 15 may support the roller 16, with a cover 18 rolled thereon. The supports 14, 15 are capable of positioning the roller 16 about an approximately 270° radius with respect to the pivot points 34 of the supports 14 and 15. The roller 16 may be elongated and may be operatively connected to one of the supports 14, 15 at each end thereof to thereby support the roller 16 along the length of the trailer 12. The roller 16 may also include a drive (not shown) for selectively rotating the roller 16 about its longitudinal axis. The drive may control the rolling or unrolling of the cover 18 from the roller 16.

The cover 18 may be generally rectangular shaped for selectively covering cargo 20 located on the trailer 12. The cover 18 may be sized to cover the maximum permitted trailer size load for a trailer, e.g., about 48 feet long and 25 feet wide. The cover 18 may be selectively attachable on one long side to the roller 16 using any suitable attachment means, e.g., velcro, straps, hooks, or snaps. All four sides of the cover 18 (i.e., the front edge, rear edge, and side edges) may be adapted for selective attachment to a side, front or rear of the trailer 12 during covering.

A control panel (not shown) may be used for selectively controlling the positioning of the supports and to control the drive. The movement of the supports 14, 15 may be controlled by any suitable means, e.g., hydraulically, electrically, or mechanically. The control panel may be operated by a single person which allows for the entire covering or uncovering of the trailer 12 by a single person any where along the truck route. The control panel may be used to position the roller 16 adjacent one side of the trailer 12.

The drive may then turn the roller 16 and unroll a portion of the cover 18 from the roller 16. One long side of the cover 18 may be allowed to hang freely along the first side of the trailer 12 or one long side of the cover 18 may be attached to the first side of the trailer 12. The control panel may then be used to change the position of the roller 16 to the other side of the trailer 12, thereby unrolling the cover 18 over any cargo 20 located on the trailer 12. Once the roller 16 is adjacent the other side of the trailer 12, the cover 18 may be completely unrolled from the roller 16. Once the cover 18 is free from the roller 16, the other long side of the cover 18 may hang freely along the other side of the trailer 12 or the other long side of the cover 18 may be attached to the other side of the trailer 12. The cover 18 may then be secured to the trailer 12 with any suitable means, e.g., bungy cords, straps, or rope.

After the cover 18 is secured to the trailer 12, the roller 16 may then be positioned above the cargo 20 for transport on the trailer 12. The roller 16 may also be secured to the trailer 12 with any suitable means, e.g., bungy cords, straps, or rope.

If the driver chooses not to unroll the cover 18 from the roller 16, the cargo 20 may be covered by keeping the roller 16 positioned on the other side of the trailer 12 adjacent the bed of the trailer 12, to thereby cover 18 the cargo 20. By maintaining the roller 16 adjacent the bed of the trailer 12 during transport there is no need to attach the second side of the cover 18 to the trailer 12 or completely unroll the cover 18 from the roller 16.

Cargo loading of the trailer 12 may be facilitated by using the control panel to position the roller 16 with a cover 18 attached thereon at the side of the trailer 12 to permit loading from the other side of the trailer 12, above the trailer 12 to permit loading from both sides, and to the side of the trailer 12 to permit top loading or overhead loading of the trailer 12. The roller 16 may also be positioned to the side and below the bed of the trailer 12 to permit top loading.

The uncovering of the cargo 20 loaded on a trailer 12 and covered by a cover 18 secured to the trailer 12 on both sides thereof, may be accomplished by positioning the roller 16 to one side of the trailer 12. A first side of the cover 18 may be detached from the trailer 12 and the cover 18 may then be selectively attached to the roller 16. The control panel may then be used to move the roller 16 to a position adjacent the other side of the trailer 12 while rotating the roller 16, to thereby roll the cover 18 onto the roller 16 as the cargo 20 on the trailer 12 is uncovered. The other side of the cover 18 may then be detached from the second side of the trailer 12 and completely rolled onto the roller 16. The cover 18 may then be secured to the roller 16.

During inclement weather, e.g., rain or snow, unloading of the cargo 20 may be accomplished so as to protect the cargo 20 from the elements by first attaching the exposed side of the cover 18, at the first side of the trailer 12, to the roller 16. Next the roller 16 may be raised to permit access to the cargo 20 from the first side of the trailer 12 while still keeping the cargo 20 covered. After each piece of the cargo 20 is unloaded, the roller 16 may be repositioned down and to the side of the trailer 12 to thereby cover and protect the cargo 20 remaining on the trailer 12. The raising and lowering of the roller 16 may be repeated until all the cargo 20 is unloaded.

Figure 2:
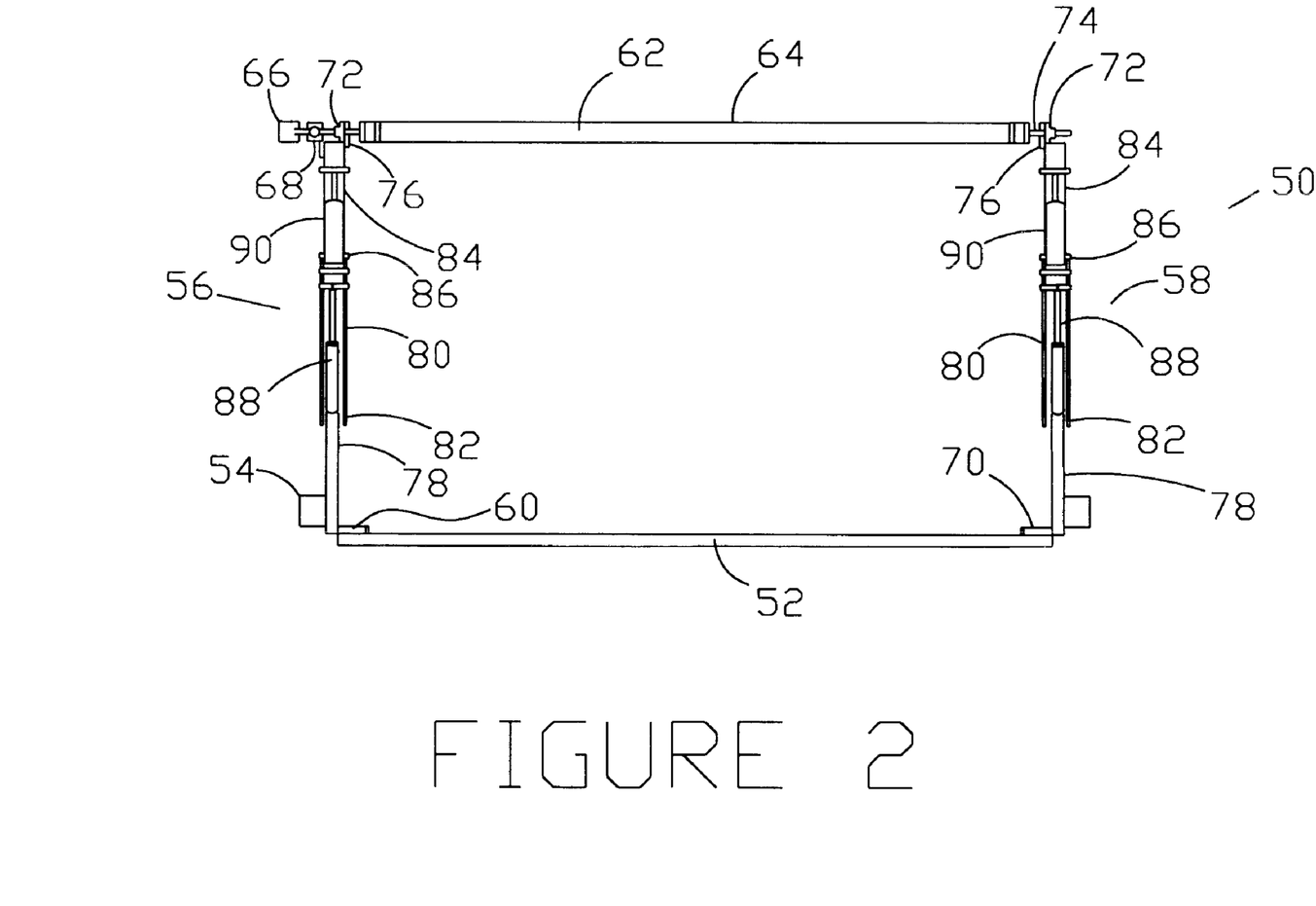
FIG. 2 is a schematic side view of another embodiment of the present invention showing a base, an upright section, and two pivotable arms and the roller positioned for loading the trailer from either side.

FIG. 2 illustrates another embodiment of the present invention. Referring to FIG. 2, the cargo covering system 50 shows that supports 56, 58 may be operatively attached to the front and rear of a trailer 52. The supports 56, 58 may position a roller 62, with a cover 64 attached thereto, above the trailer 52 to allow for loading from either side of the trailer 52. A control panel 54 which may be attached to a first support 56 may be used to selectively position the supports 56, 58.

The supports 56, 58 may also include a base 60, 70. The supports may support a roller 62, with a cover 64 attached thereto. The roller 62 may be attached to the supports 56, 58 by an attachment means 76 which is adapted to be operatively connected to the roller shaft 74. A roller bearing 72 or flange block may also be attached to the shaft 74 adjacent the attachment means 76.

The roller 62 may also include a drive 66 for selectively rotating the roller 62 about its longitudinal axis, so that the cover 64 when attached to the roller 62 may be rolled or unrolled thereon. The drive 66 may be attached to the shaft 74 by any suitable attachment means, e.g., a rigid coupling 68. The drive 66 may be used to roll or unroll the cover 64 from the roller 62. The drive 66 may be any suitable drive for rotating the shaft, e.g., hydraulic motor, electric motor, or a rewind mechanism. The drive 66 may also be controlled by the control panel 54. The drive 66 allows the operator to control the amount of the cover 64 that is unrolled from the roller 62, making control of the cover 64 possible during covering or uncovering operations in high winds. During high winds the drive 66 may be used roll up the cover 64 quickly and to hold the cover 64 in place, to prevent injury or damage to the cover 64. In another embodiment of the invention the drive 66 may freely allow the unrolling of the cover 64 from the roller 62 without resistance from the drive 66.

During covering when the roller 62 is provided with a rewind mechanism, the unrolling of the cover 64 from the roller 62 as the roller 62 is mechanically moved from a first to the second position under control of the control panel 54 is resisted by the rewind mechanism. During uncovering, the cover 64 is rewound on the roller 62 as the roller 62 is subsequently mechanically moved from the second to the first position under control of the control panel 54 to thereby uncover any cargo on the trailer 52.

With continued reference to FIG. 2, the supports 56, 58 may also include an upright member 78 attached to a first pivotable arm member 80 at a pivot point 82. A second pivotable arm member 84 may be attached to the first pivotable arm member 80 at a pivot point 86. The pivotable arm members 80, 84 may be any suitable arms, e.g., single arm member, double arm member, or lever. The movement of the pivotable arm members 80, 84 may be controlled by any suitable means, e.g., hydraulic, electrical, or mechanical. For example, the movement of the pivotable arm members 80, 84 may be hydraulically controlled by pistons 88, 90. Piston 88 may be attached to the upright member 78 and the first pivotable arm member 80. Piston 90 may be attached to the second pivotable arm member 84 and the first pivotable arm member 80. The control panel 54 may be used to control the movement of each piston 88, 90 individually so as to position each pivotable arm member 80, 84 about a pivot point 82 to thereby cover or uncover the trailer 52 and any cargo loaded thereon. The individual movement of each pivotable arm member 80, 84 allows the supports 56, 58 to position the roller 62 over an approximately 270° degree radius with respect to each pivot point 82.

The covering system may also be adapted to be removably attached to a trailer which allows for the covering system to be used on a plurality of trailers. Referring again to FIG. 2, after the cargo on the first trailer is covered, the roller 62 may be positioned to the first side of the trailer 52 so that the roller 62 and drive 66 may be removed from the supports 56, 58. The control panel 54 may then be removed from the first support 56. The supports 56, 58 may then be removed from their respective bases 60, 70. The covering system may then be attached to a second trailer by first attaching the bases 60, 70 and then the supports 56, 58 to the second trailer. The control panel 54 may then be attached to the first support 56. The control panel 54 may then position the supports 56, 58 to the first side of the second trailer so that the roller 62 may be attached to the supports 56, 58. A new cover may then be attached and rolled onto the roller 62 driven by the drive 66. The system may then be used to cover the second trailer. The steps may be repeated to allow a plurality of trailers to be covered.

Figure 3:
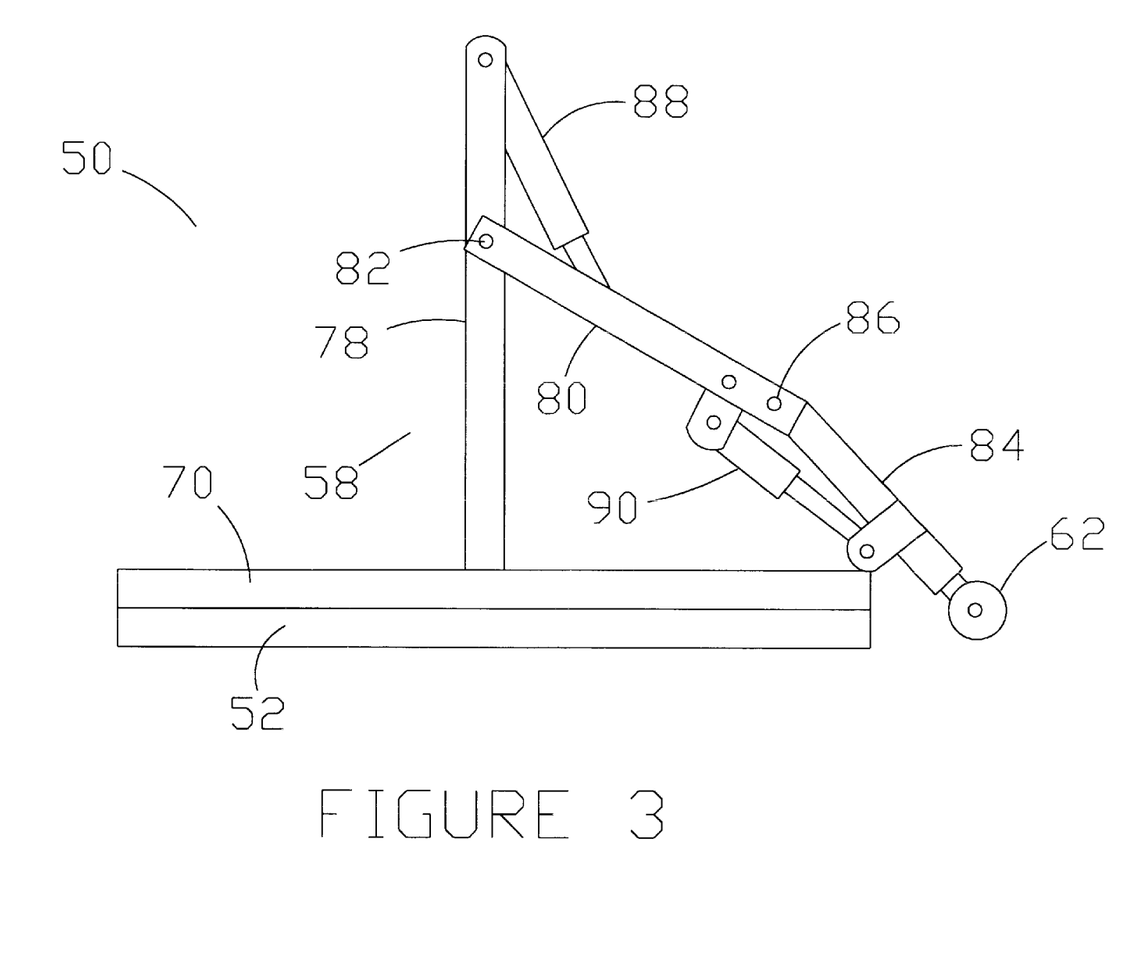
FIG. 3 is a schematic end view showing the embodiment of the support of FIG. 2 with the roller positioned to the side of and below the bed of the trailer for top loading of the trailer.
Figure 4:
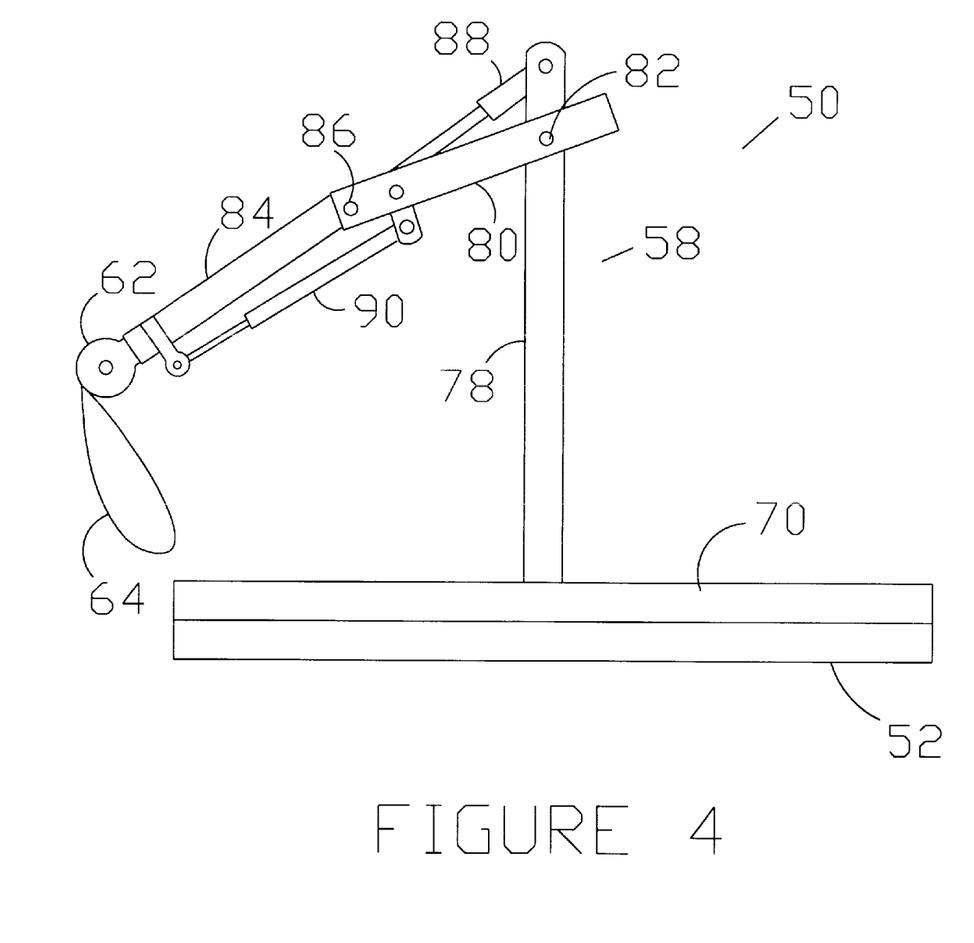
FIG. 4 is a schematic end view showing the embodiment of the support of FIG. 2 with the roller positioned to the side of the trailer for one side loading of the trailer or for attaching the cover to one side of the trailer.
Figure 5:
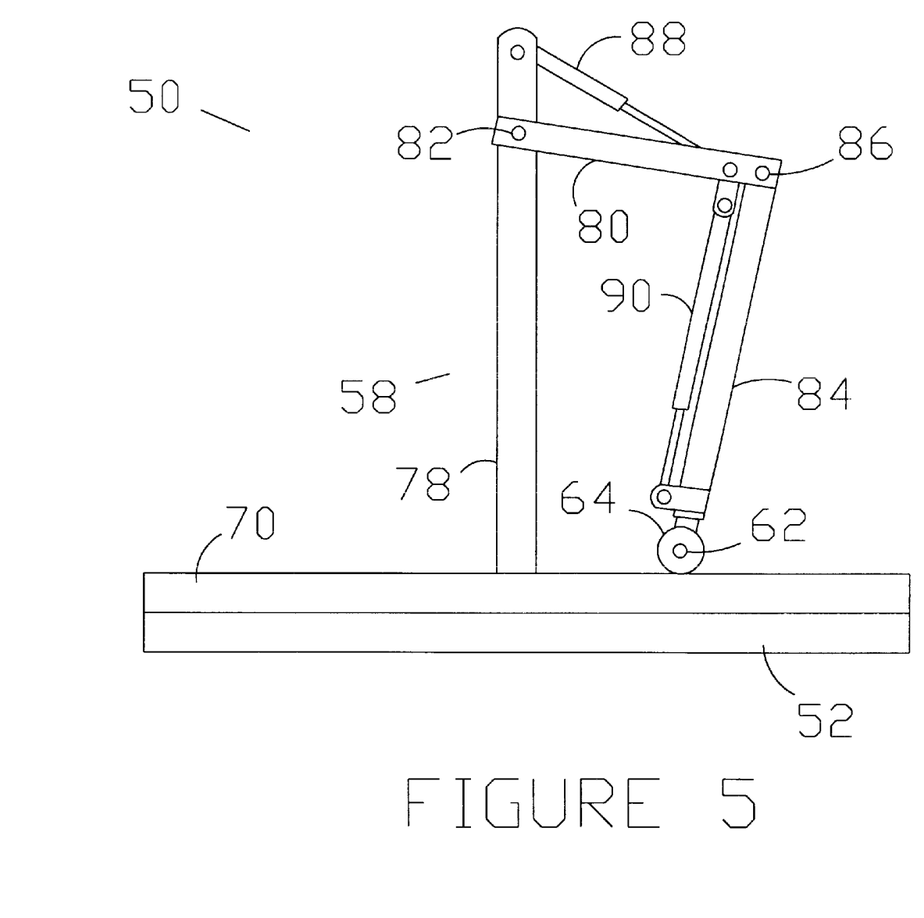
FIG. 5 is a schematic end view showing the embodiment of the support of FIG. 2 with the roller positioned on the deck of the trailer for secure transport when the trailer has no cargo.

As shown in FIGS. 3, 4 and 5 the cargo covering system 50 may be used to position the roller 62 to allow for loading and unloading of the trailer 52 and transport of the roller 62 on an unloaded trailer 52. Referring to FIG. 3, the cargo covering system 50 shows that the roller 62 may be positioned by the support 58 to the side and below the bed of the trailer 52 to allow for top or overhead loading of the trailer 52. Referring to FIG. 4, the cargo covering system 50 shows that the roller 62 may be positioned by the support 58 to the side of the trailer 52 to allow for one side loading of the trailer 52, top loading of the trailer 52, or for attaching the cover 64 to one side of the trailer 52. Referring to FIG. 5 the cargo covering system 50 shows that the roller 62 and cover 64 may be positioned by the support 58 on the deck of the trailer 52 for secure transport when the trailer 52 is empty. The roller 62 and cover 64 may be transported on the bed of the trailer 52 and the ends of the roller 62 may overhang the supports at the ends thereof. The cover 64 may be secured to the roller 62 with any suitable means, e.g., bungy cords, rope, or straps.

Figure 6:
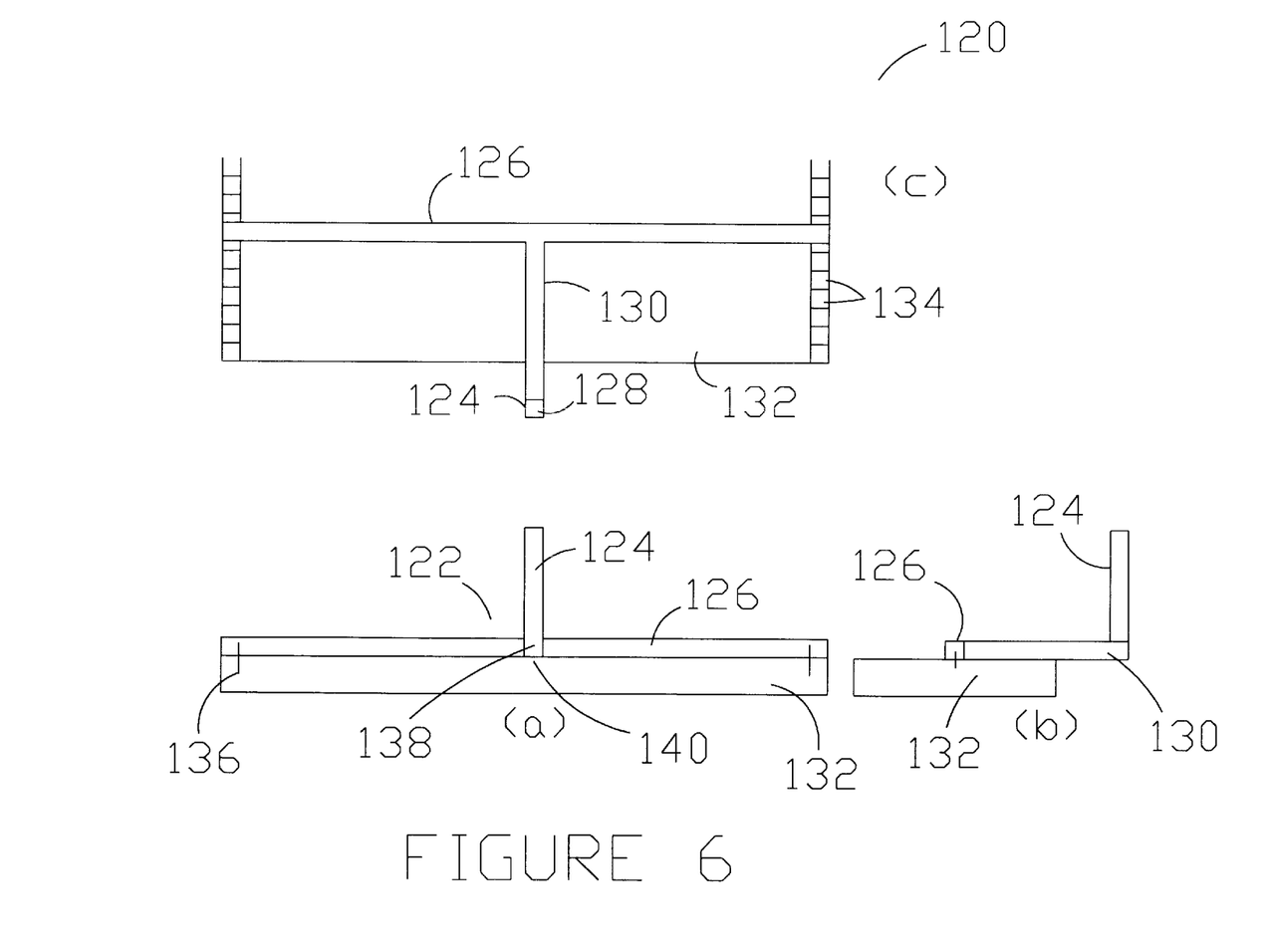
FIGS. 6(a), 6(b) and 6(c) are end, side and top plan schematic views respectively of one embodiment of the base and upright member of the support of FIG. 2.

FIG. 6 illustrates one embodiment of a base and upright member of the present invention. Referring now to FIG. 6, the base and upright member of the cargo covering system 120 consists of a base 122 adapted to receive an upright member 124 of the support. The base 122 may include an opening 128 to receive the upright member 124 of the support at an attachment point 138. Alternatively, the base 122 and upright member 124 may be welded into a unitary structure. The base 122 may be removably attached to the trailer 132 by any suitable means, e.g., bolt, u-bolt, magnet, or screw, and may be attached at an attachment point 140. The upright member 124 of the support may be attached to the base 122 by any suitable means, e.g., bolt or pin. The base 122 may also include a longitudinal member 130 attached to a transverse member 126, with both members 126, 130 adapted to overlie the bed of the trailer 132 in contact therewith. The transverse member 126 may engage the trailer 132 at the side holes 134 of the trailer 132, sometimes formed by the addition of a rub rail to the sides of the trailer 132. The transverse member 126 may have downward turning ends 136 which fit into and may be secured by pins or bolts. Alternatively, the horizontal ends may be provided with an aperture and bolted to the trailer 132.

Figure 7:
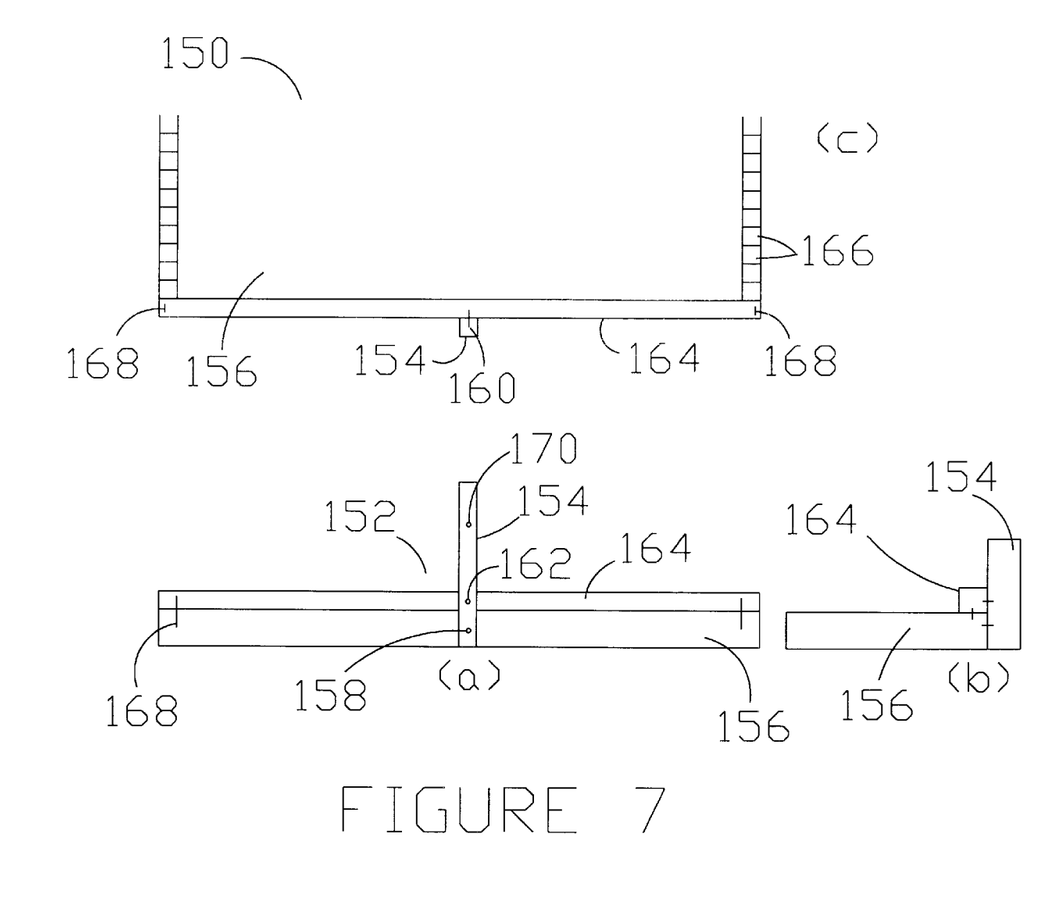
FIGS. 7(a), 7(b) and 7(c) are end, side and top plan schematic views respectively of a second embodiment of the base and upright member of the support of FIG. 2.

FIG. 7 illustrates another embodiment of a base and upright member of the present invention. Referring now to FIG. 7, the base and upright member of the cargo covering system 150 consists of a base 152 adapted to receive an upright member 154 of the support. The base 152 may be removably attached to the trailer 156 using any suitable means, e.g., bolt, u-bolt, or screw. The base 152 may be attached to the trailer 156 at attachment point 158. The base 152 may include an opening 160 to receive the upright member 154 of the support for attachment to the base 152 at an attachment point 162. The base 152 may include a transverse member 164 adapted to overlie the bed of the trailer 156 in contact therewith. The transverse member 164 may be adapted to engage the trailer 156 at the side holes 166 of the trailer 156 with downward turning ends 168 or bolted thereto as earlier described. The upright member 154 of the support may also include a pivot point 170.

The base 152 may also be attached to the trailer 156 by first attaching the upright member 154 of the support to the trailer 156 at an attachment point 158, and then attaching the upright member 154 of the support to the base 152 at an attachment point 162. Any suitable means may be used to attach the upright member 154 of the support to the trailer 156 and base 152, e.g., bolts, screws, or pins.

Figure 8:
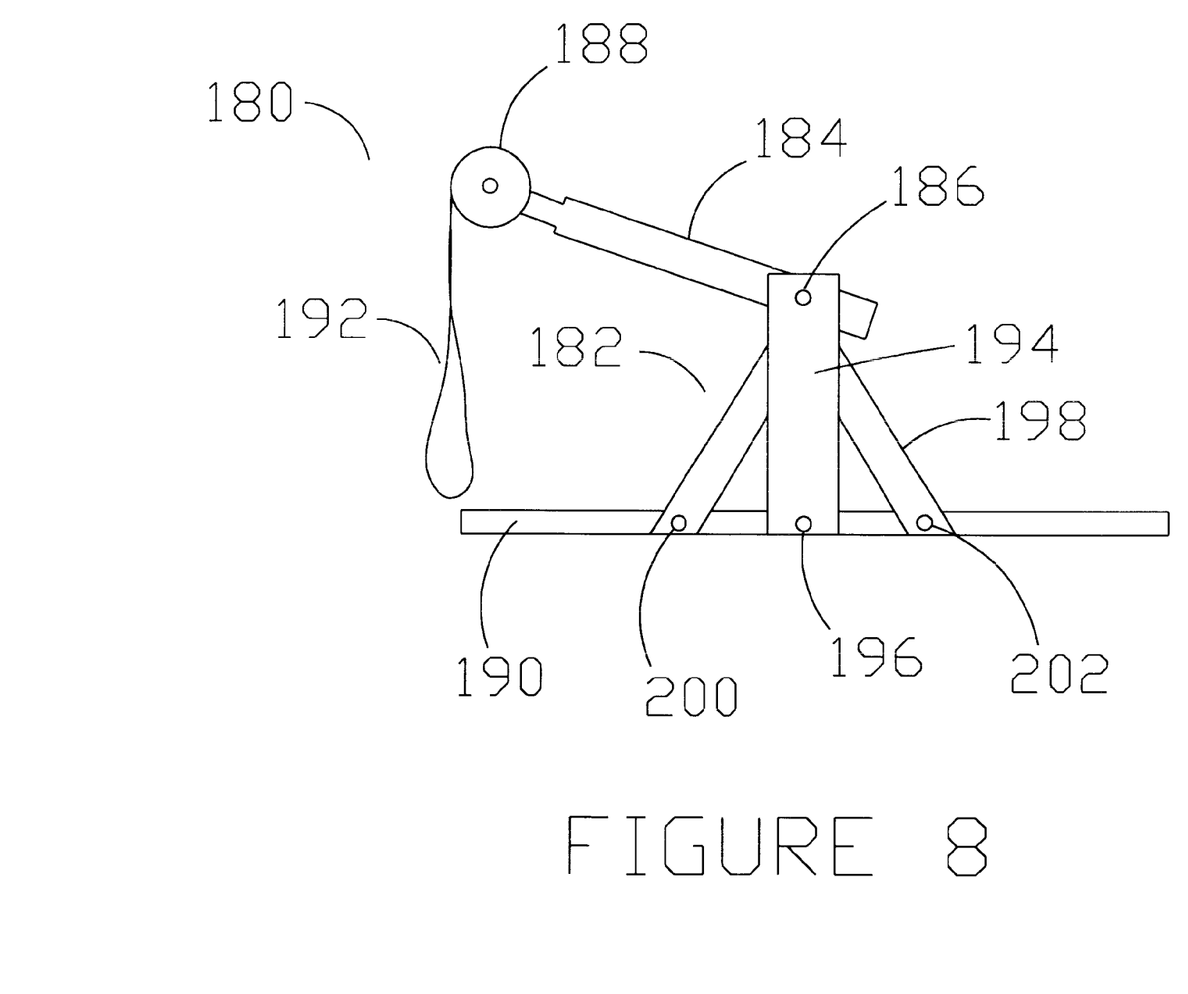
FIG. 8 is an end view of a another embodiment of the base and upright member of the support of the present invention with a single pivotable arm.

FIG. 8 illustrates another embodiment of a base and upright member of the present invention. Referring now to FIG. 8, the base and upright member of the cargo covering system 180 includes a base 182 attached to a pivotable arm 184 at a pivot point 186. The base 182 may include an upright member 194 and may be attached to the trailer 190 at an attachment point 196. The base 182 may also include an A-frame support 198, or by any suitable frame support, e.g., triangular frame. The A-frame support 198 may also be attached to the trailer 190 at two attachment points 200, 202 by any suitable means, e.g., bolts or screws. The location of the pivot point 186 allows the pivotable arm 184 to be positioned from one side of the trailer 190 to the other side of the trailer 190. Movement of the pivotable arm 184 and the other pivotable arm (not shown) allows the roller 188 to be positioned from one side of the trailer 190 to the other to allow for covering or uncovering of the trailer 190 and any cargo loaded thereon with the cover 192. The roller may also be used to position straps over the cargo or cover.

Referring again to FIG. 1, typically straps or other tie-down means are used to secure the cargo 20 to the trailer 12 and/or after covering the cargo 20 to secure the cover 18 to the trailer 12. The cargo covering system 10 may also be used to selectively position the straps or tie down means over the cargo 20 or the covered cargo.

Often flat straps are carried by the trailer 12 on spools along one side thereof. Depending on the location of the cargo 20, selected straps are unspooled and placed over the cargo 20 as tie downs. Chains are also used.

After the cargo 20 is loaded on the trailer 12, the roller 16 may be positioned to the first side of the trailer 12. Selected straps may then be removably attached to the roller 16 (or to the cover 18 rolled thereon) by any suitable means, e.g., velcro, rope, or by tying the straps around the roller 16. Once the straps are attached, the roller 16 may then be positioned from the first side of the trailer 12 to the other side of the trailer 12 to thereby position the straps over the cargo 20 loaded on the trailer 12. The straps may then be detached from the roller 16, attached to both sides of the trailer 12, and then tightened to secure the cargo 20 to the trailer 12. These steps may be repeated after the cargo 20 is covered to secure the cover 18 onto the trailer 12 with straps.

Figure 9:
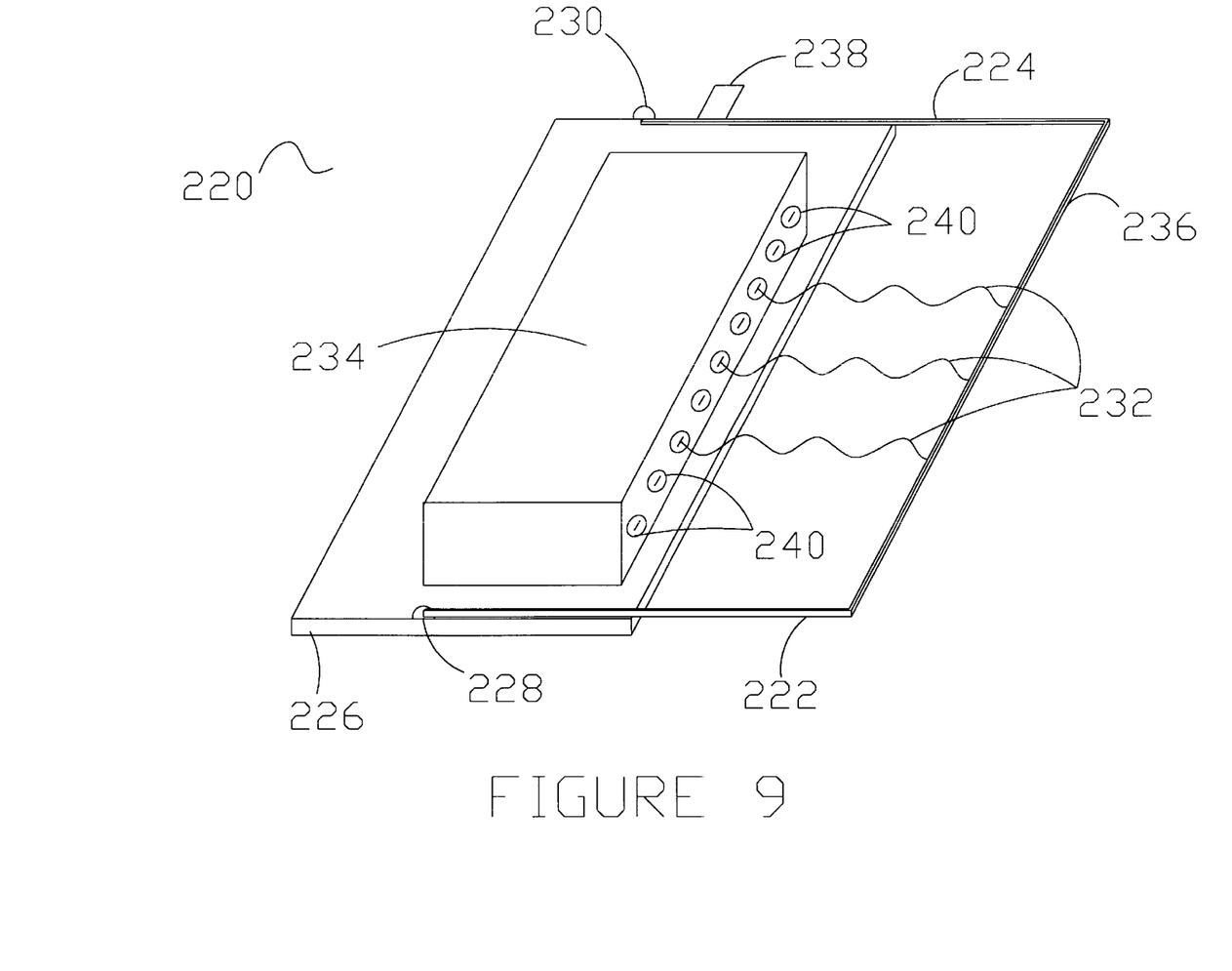
FIG. 9 is a schematic view of another embodiment of the present invention showing pivotable supports and a roller for positioning straps over cargo loaded on a trailer.
Figure 10:
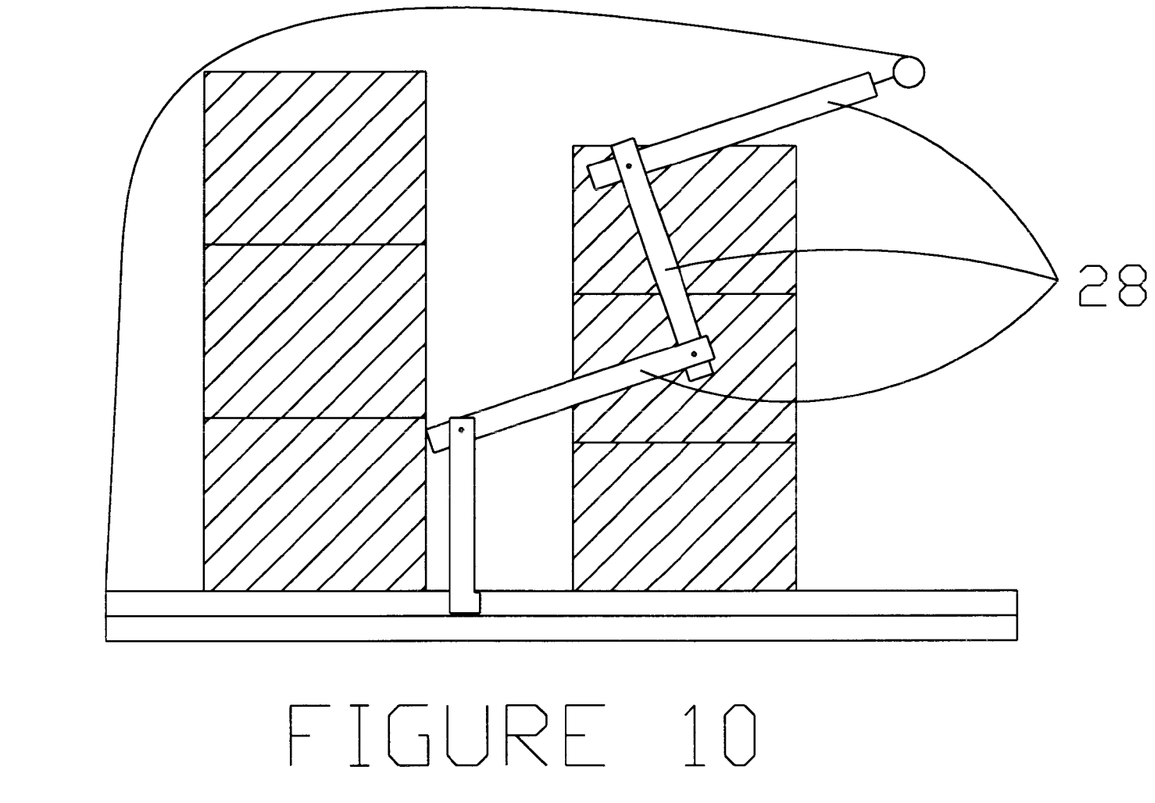
FIG. 10 is a schematic of another embodiment of the present invention showing a pivotable arm which includes three pivotable arm members.

FIG. 9 illustrates another embodiment of the cargo covering system of the present invention. Referring now to FIG. 9, the cargo covering system 220 may be used to selectively position straps 232 or other tie down means over the cargo 234 loaded on a trailer 226 and/or to selectively position straps over a covered cargo loaded on the trailer 226. The cargo covering system 220 may also include a control panel, roller, and drive.

In its simplified form, supports 222, 224 may be operatively attached to the front and rear of a trailer 226 at pivot points 228, 230. The supports 222, 224 may be operatively attached to the trailer 226 at the pivot points 228, 230 by any suitable means, e.g., bolt, u-bolt, screw, attached to a base or magnetic base. The supports 222, 224 may position an elongated bar 236 or roller from one side of the trailer 226 to the other. The supports may be any suitable material, e.g., steel, aluminum, plastic or PVC pipe and may also comprise telescoping arms that are extended when in use and contracted when not in use to allow the elongated bar 236 to be positioned on the bed of the trailer 226 or above the cargo 234. The elongated bar 236 may be any suitable material, e.g., steel, aluminum, plastic or PVC pipe, and may also collapsible and detachable from the supports 222, 224 when not in use.

The supports 222, 224 may be positioned by any suitable means, e.g., mechanical, hydraulic, electrical or by hand., The truck driver may also use a pole to push the center of the elongated bar 236 from one side of the trailer 226 to the other or a handle 238 may be attached at least one of the supports 224 and used to pivot bar 236 from one side of the trailer 224 to the other.

To cover the cargo 234 loaded on the trailer 226 with straps 232 or other tie down means, the elongated bar 236 may be positioned at one side of the trailer 226. Straps 232 may be operatively connected to one side of the trailer 226 by spools 240, as is well known in the art, or the straps may be provided unattached to the trailer 226. The straps 232 may be removably attached to the elongated bar 236 by any suitable means, e.g., velcro, rope, or by tying the straps 232 around the elongated bar 236. Once the straps 232 are attached, the elongated bar 236 may then be positioned from one side of the trailer 226 to the other side of the trailer 226 to thereby position the straps 232 over the cargo 234. The straps 232 may then be detached from the elongated bar 236, attached to the other side of the trailer 224, and then tightened over the cargo 234 to thereby secure the cargo 234 to the trailer 226. If the straps 232 are not connected to the trailer 224 by spools 240, the straps 232 may be detached from the elongated bar 236, attached to both sides of the trailer 226, and then tightened over the cargo 234 to thereby secure the cargo 234 to the trailer 226.

These steps may be repeated to secure the cargo to the trailer and to secure the cover (not shown) to the trailer 226 after the secured cargo is covered. The cover (not shown) may also be attached to the elongated bar 236 and may be positioned over the cargo 234 loaded on the trailer 226 without being rolled thereon.

Other embodiments of the invention include a covering system adapted to be operatively attached to a separate wheeled car which may be positioned next to the trailer along one side to enable the covering or uncovering of the cargo without the requiring the system to be attached to the trailer. Another embodiment includes where each support has a separate wheeled means to allows the supports to be positioned at the front and rear of the trailer to allow for covering or uncovering of the load without attaching the system to the trailer.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof

What is claimed is:

1. A method of covering cargo loaded on a flatbed trailer comprising the steps of:
   (a) providing a support at each end of a the flatbed trailer and a cover rolled up on an elongated roller supported between the supports;
   (b) positioning the roller adjacent one side of the trailer;
   (c) unrolling the cover from the roller while moving the roller to a position adjacent the other side of the trailer to thereby cover the cargo on the trailer; and
   (d) securing the cover to at least one of the trailer and the cargo.

2. The method of claim 1 including the further steps of attaching the exposed side of the rolled cover to the one side of the trailer and using the tension resulting from such attachment as the roller is moved to the other side of the trailer to effect unrolling of the cover.

3. The method of claim 2 including the further steps of unrolling the cover over the cargo without attaching the exposed side of the rolled cover to the one side of the trailer.

4. The method of claim 1 wherein the supports are removably attachable at the ends of the trailer and the roller is removably attachable to the supports so that the supports and roller may be used with different trailers.

5. The method of claim 1 wherein each of the supports comprises a base, an upright member, and at least one pivotable arm.

6. A method of covering cargo carried by a substantially planar surface of a trailer comprising the steps of:
   (a) providing a support at each end of a loaded trailer and a cover rolled up on an elongated roller supported between the supports;
   (b) positioning the roller adjacent a first side of the trailer;
   (c) unrolling the cover from the roller while moving the roller to a position adjacent the opposite side of the trailer from the first side thereof to thereby cover the cargo on the trailer;
   (d) removably attaching a plurality of straps to said roller at selected positions along the length thereof while the roller is positioned alongside a second side;
   (e) moving the roller to a position adjacent the side of the trailer opposite to the second side thereof to thereby simultaneously position the straps over the covered cargo;
   (e) securing both ends of the straps to either the trailer or to the cargo to thereby secure the cover over the cargo.

7. A method of covering and securing cargo on a substantially planar surface of a trailer comprising the steps of:
   (a) providing a support at each end of a loaded trailer and a cover rolled up on an elongated roller supported between the supports;
   (b) positioning the roller adjacent a first side of the trailer;
   (c) removably attaching a plurality of straps to said roller at selected positions along the length thereof; and
   (d) moving the roller to a position adjacent the other side of the trailer to thereby simultaneously position the straps over the cargo without unrolling the cover;
   (e) securing both ends of the straps to the trailer to thereby secure the cargo to the trailer; and
   (f) unrolling the cover from the roller while moving the roller to a position adjacent the other side of the trailer to thereby cover the secured cargo on the trailer.

8. The method of claim 7 including the further steps of:
   (g) removably attaching a second plurality of straps to said roller at selected positions along the length thereof; and
   (h) moving the roller to a position adjacent the other side of the trailer to thereby simultaneously position the straps over the covered cargo;
   (i) securing the straps to the trailer to thereby secured the cover over the cargo and additionally secure the cargo to the trailer.

9. A method of uncovering cargo loaded on a substantially planar surface of a trailer and covered by a generally rectangular cover secured to at least one of the group comprising of the trailer and the cargo, said method comprising the steps of:
   (a) providing a support at each end of a trailer and an elongated roller supported between the supports;
   (b) positioning the roller adjacent a first side of the trailer;
   (c) detaching a first side of the cover from the trailer and attaching it to the roller; and
   (d) moving the roller to a position adjacent the other side of the trailer while rotating the roller to thereby roll the cover up on the roller and uncover the cargo on the trailer.

10. The method of claim 9 including the further step of:
    (e) positioning the roller above the cargo to thereby permit access to the cargo from either side of the trailer.

11. The method of claim 9 including the further step of:
    (e) moving the roller to a position to the side of and below the bed of the trailer to allow access to the cargo from top of the trailer.

12. The method of claim 9 including the further step of:
    (e) moving the roller to a position adjacent to the trailer after the cargo has been removed therefrom to secure the cover while the trailer is being moved without cargo.

13. The method of claim 9 wherein the supports are removably attachable at the ends of the trailer and the roller is removably attachable to the supports so that the supports and roller may be used with different trailers.

14. The method of claim 9, wherein each of the supports comprises a base, an upright member, and at least one pivotable arm.

15. A method by which a single person may mechanically cover the cargo loaded on a flatbed trailer comprising the steps of:
    (a) providing a roller mechanically movable from a first position adjacent the bed of the trailer on one side thereof to a second position adjacent the bed of the trailer on the other side thereof, the mechanical movement of the roller being controllable by a single person from a control panel;
    (b) rolling a cover on the roller;
    (c) attaching one side of the cover to the trailer with the roller in the first position; and
    (d) moving the roller to the second position under control of the control panel to cover any cargo loaded on the trailer.

16. The method of claim 15 wherein the movement of the roller relative to the trailer and the rotation of the roller are independently controllable from the control panel.

17. The method of claim 15 wherein the roller is provided with a rewind mechanism and wherein the unrolling of the cover from the roller as the roller is moved from the first to the second position under control of the control panel is resisted by the rewind mechanism so that the cover is rewound on the roller as the roller is subsequently moved from the second to the first position under control of the control panel.

18. The method of claim 15 wherein the roller may be positioned over an angle of approximately 270° about the first pivot point of the support.

19. A method of covering the cargo of a plurality of flatbed trailers comprising the steps of:
   (a) removably attaching supports at each end of a first trailer;
   (b) supporting a roller with a first cover rolled thereon between the supports;
   (c) positioning the roller with the first cover rolled thereon adjacent the first trailer on one side thereof;
   (d) rolling the roller over the cargo to a position adjacent the first trailer on the other side thereof to thereby unroll the first cover from the roller and cover the cargo;
   (e) detaching the roller from the supports;
   (f) detaching the supports from the first trailer;
   (g) removably attaching the supports to the ends of a second trailer;
   (h) supporting a roller with the second cover between the supports; and
   (i) repeating steps (c)–(f) with respect to the second trailer.

20. A method of securing cargo loaded on a flatbed trailer comprising the steps of:
   (a) providing a bar adjacent a first side of the trailer;
   (b) removably attaching a plurality of straps to said bar at selected positions along the length thereof; and
   (d) moving the bar to a position adjacent the other side of the trailer to thereby simultaneously position the straps over the cargo.

21. In a system for covering and uncovering a flatbed trailer, the improvement comprising a roller with a cover attached thereon selectively positionable at the side of the trailer to allow for loading from the other side of the trailer, positionable above the trailer to allow for loading from both sides, and positionable to the side and below the bed of the trailer to allow for top loading of the trailer.

22. A system for securing cargo loaded on a flat bed trailer with tie-downs comprising:
   a pair of supports adapted to be pivotably connected at one end thereof to the front and rear of the trailer;
   a bar operatively interconnecting the other ends of said supports to thereby support said bar along the length of the trailer when said supports are mounted thereon;
   a plurality of tie-downs each selectively attachable on one end to said bar and to the trailer,
   said bar being selectively positionable from one side of the trailer to the other side of the trailer to thereby position said straps over any cargo loaded on the trailer.

23. A cargo covering system for covering cargo on a flat bed trailer with a flexible cover comprising:
   a pair of supports adapted to be connected at the front and rear of the trailer;
   an elongated roller operatively connected to one of said supports at each end thereof to thereby support said roller along the length of the trailer when said supports are mounted thereon;
   a generally rectangular flexible cover for selectively covering cargo when located on the trailer, said cover being attachable on one long side to said roller and both of the long sides of said cover being adapted for selective attachment to a side of the trailer;
   a drive for said roller for selectively rotating said roller about its longitudinal axis so that said cover when attached to said roller may be rolled thereon; and
   a control panel for selectively controlling said mechanical supports when attached to a trailer (a) to position said roller adjacent one side of the trailer so that one long side of said cover when rolled on said roller may be attached to the trailer, and (b) to position said roller adjacent to the other side of the trailer into position to be attached to the other side of the trailer while unrolling the cover over any cargo on the trailer.

24. A covering system for covering cargo loaded on a substantially planar surface of a trailer comprising:
   supports adapted to be operatively connected at the ends of the trailer;
   an elongated roller operatively supported between said supports;
   a generally rectangular flexible cover being attachable on one long side to said roller, both of the long sides of said cover being adapted for selective attachment to a side of the trailer;
   a drive for said roller for selectively rotating said roller about its longitudinal axis; and
   a control panel for selectively controlling the positioning of said roller by said supports from one side of the trailer to the other side of the trailer and the rotation of said roller to thereby effect the covering or uncovering of any cargo loaded on the trailer.

25. The system of claim 24, wherein said supports are adapted to be operatively connected to the sides of the trailer immediately adjacent the ends thereof.

26. The system of claim 24, wherein said roller is positionable to the side and below the bed of the trailer to allow for top loading of the trailer.

27. The system of claim 24, wherein said roller is positionable adjacent to the bed of the trailer to reduce wind resistance when the trailer is moved without cargo.

28. The system of claim 24, wherein said roller is positionable sufficiently high above the trailer to allow for loading of the trailer from both sides by fork lifts.

29. The system of claim 24, wherein said roller is selectively positionable at either side of the trailer to allow for loading from the opposite side of the trailer, above the trailer to allow for loading from both sides of the trailer, and to the side and below the bed of the trailer to allow for top loading of the trailer.

30. The system of claim 24, wherein said roller is positionable through an arc not less than about 180° about the first pivot point of said support.

31. The system of claim 30 wherein said roller is positionable through an arc of approximately 270° about the first pivot point of said support.

32. The system of claim 24, including a plurality of tie-downs removably attached to said roller whereby said roller may be used to position said tie-downs from one side of the trailer to the other side of the trailer.

33. The system of claim 24, wherein each of said supports is removably attached to the trailer.

34. The system of claim 24, wherein each of said supports includes a base, an upright member, and a pivotable arm attached to said upright member.

35. The system of claim 34, wherein said base comprises a transverse member adapted to overlie the bed of the trailer in contact therewith, said base being adapted for attachment to the trailer.

36. The system of claim 35, wherein both ends of said transverse member turn downwardly and are adapted to engage the trailer along the sides thereof.

37. The system of claim 35, wherein said base further comprises a longitudinal member connected between said upright member and said transverse members, said longitudinal member being adapted to overlie the bed of the trailer in contact therewith.

38. The system of claim 34, wherein said pivotable arm includes two members pivotably connected to each other.

39. The system of claim 34, wherein said pivotable arm includes three members pivotably connected to each other.

40. A support for a cargo covering system adapted to be connected at the ends of a substantially planar surface of a trailer comprising:

an upright member;

a first pivotable arm member pivotably connected to said upright member;

a second pivotable arm member pivotally connected to said first pivotable arm member;

a first piston operatively connected to said upright member and said first pivotable arm member to control the angle therebetween; and a second piston connected to said first pivotable arm member and said second pivotable arm member to control the angel therebetween.

41. The support of claim 40 wherein the distal end of said second pivotable arm member is rotatable over an arc greater than 180° about the pivotable connection between said upright member and said first pivotable arm member.

42. The support of claim 41 wherein the distal end of said second pivotable arm member is rotatable over an arc of approximately 270° about the pivotable connection between said upright member and said first pivotable arm member.

43. The support of claim 40 including a control panel for selectively controlling the operation of said pistons.

* * * * *